United States Patent Office 2,776,998
Patented Jan. 8, 1957

2,776,998
ANTIOXIDANT

Paul M. Downey, Gainesville, Fla., assignor to Monsanto Chemical Company, St. Louis, Mo., a corporation of Delaware No Drawing. Original application June 10, 1950, Serial No. 167,498, now Patent No. 2,726,277, dated December 6, 1955. Divided and this application February 26, 1954, Serial No. 412,932

1 Claim. (Cl. 260—609)

This invention relates to a rubber latex antioxidant and to the method of making the same.

Latex compositions and particularly natural latex normally contain an anticoagulant and an antiseptic or germicide. Additionally it is common practice to add an antioxidant for the rubber. All of these ingredients are loosely referred to as preservatives but the present invention is concerned only with the antioxidant type of preservative. In the manufacture of articles from a latex rubber the compounding and vulcanizing ingredients including the antioxidant must be added to the matrix before the rubber is coagulated. Many otherwise suitable antioxidants cannot be used in latex because of some adverse effect on the system such as discoloring or destabilizing the dispersion. For example, certain phenolic sulfides are valuable non-discoloring antioxidants for massed rubber but possess the unfortunate disadvantage of thickening latex and some even bring about immediate coagulation. The present invention provides a class of non-discoloring phenolic sulfide antioxidants which are eminently suitable for addition to an aqueous dispersion of a rubber.

In accordance with the present invention it has been discovered that thiobis(4,6-dialkyl phenols) containing at least four but less than eight carbon atoms in each alkyl group are effective non-discoloring antioxidants for rubber which do not have any adverse effect on the stability of the latex but on the contrary may be added to the latex without thickening or coagulating it. It was found that the size, type, number and position of the alkyl groups all influence the compatibility with latex. These products may be prepared by reacting a 4,6-dialkyl phenol with a sulfur halide. The sulfur chlorides are convenient to use and are readily available for this purpose. Condensation of two molecular equivalents of the phenol with one molecular equivalent of sulfur dichloride produces a monosulfide or mono thio bis-phenol. Additional sulfur may be introduced into the molecule by increasing the ratio of sulfur dichloride or by substituting sulfur monochloride for sulfur dichloride. While the antioxidant effectiveness is not increased by increasing the sulfur content of the molecule, neither is it noticeably decreased until the sulfur ratio is greater than two atoms of sulfur for two dialkyl phenol radicals. Whether or not a disulfide linkage forms with higher sulfur content is not definitely known but the experimental evidence indicates as more probable that polymers are formed having more than two phenol groups linked together by sulfur atoms. Thus the composite reaction products of either sulfur monochloride or sulfur dichloride probably contain some polymeric constituents and these reaction products are suitable for incorporating into latex without further purification than to remove by-product hydrogen chloride. The sulfur would be expected to attach to the nucleus at the free ortho position and additional sulfur bridges would have to join at one of the meta positions. The term "a thiobis(4,6-dialkyl phenol)" is used in a generic sense to include the sulfur halide reaction products of 4,6-dialkyl phenols generally. The ratio of the phenol radical to sulfur may vary and includes 2:1, 1:1 and even higher sulfur ratios.

The reactions may be carried out in a solvent unaffected by a sulfur halide or preferably in the absence of a solvent by direct reaction between the phenol and sulfur halide. It is unnecessary to employ pure fractions of the dialkyl phenols. Small amounts of other isomers providing they are not present in more than a few percent have not proved deleterious. Thus it is probable that small amounts of 2,6-dialkyl phenols are present in the commercial grades of 2,4-dialkyl phenols although these commercial fractions have proved to be satisfactory without further purification. The length of the alkyl chain is a critical factor as compounds with less than four or more than seven carbon atoms in the alkyl groups cause rapid coagulation of latex. Thiobis(4,6-di-secondary amyl phenol) is about optimum and is preferred. It is absolutely non-discoloring and produces a more stable latex than thiobis(2,4-di-tertiary amyl phenol), which latter causes some, however slight, discoloration of white rubber goods and exhibits less antioxidant strength. So far as is known thiobis(4,6-di-secondary amyl phenol) has never before been described.

Without limiting the invention the following are recited to illustrate the preparation of the new antioxidants.

EXAMPLE 1

234 grams (1.0 molecular proportion) of 2,4-di-secondary amyl phenol were charged into a suitable reactor equipped with a stirrer and condenser. 58.8 grams (0.57 molecular proportion) of sulfur dichloride were gradually added to the phenol, keeping the temperature of the reaction mass below about 50° C. The volatiles were then stripped out by heating the reaction mixture at 100° C. at 80 mm. pressure with vigorous agitation. The product, consisting essentially of thiobis(4,6-di-secondary amyl phenol), was obtained as a dark brown thick liquid much more fluid than thiobis(4,6-di-tertiary amyl phenol) obtained by substituting 2,4-diamyl phenol in which the alkyl groups were predominantly tertiary for 2,4-di-secondary amyl phenol in the foregoing procedure.

EXAMPLE 2

The reaction product of sulfur monochloride was prepared by substituting 77.0 grams of sulfur monochloride for the 58.8 grams of sulfur dichloride in the foregoing example. After removal of the volatile constituents as described, there was obtained a resinous product containing substantially one atom of sulfur for each 2,4-di-secondary amyl phenol radical.

The critical differences brought about by small changes in structure may be readily demonstrated by adding the antioxidant to the latex and following the change in viscosity with time. For example a typical dipped goods base stock was compounded comprising—

| | Parts by weight |
|---|---|
| Rubber as 60% latex | 100.0 |
| Zinc oxide | 1.0 |
| Sulfur | 1.5 |
| Zinc diethyl dithiocarbamate | 0.5 |
| Antioxidant | 1.0 |

The stocks were compounded in the manner common to the art by adding zinc oxide, sulfur and accelerator in the form of dispersions to the concentrated latex. The antioxidants were also added as dispersions, the following procedure proving satisfactory for the preparation of such an antioxidant dispersion: 100 parts of the antioxidant were mixed with 10 parts of a 10% solution of ammonium caseinate with moderate stirring and 4 parts of oleic acid were then introduced and after mixing about 5 minutes, 4 parts of 10% aqueous NaOH was added and finally 82 parts of water added very slowly.

The viscosities of the latex were determined after compounding and at intervals thereafter. For this purpose a Brookfield viscometer was used. The data set forth in the table below are relative figures reported as percentages of the control stock which contained no antioxidant. In other words the control stock was arbitrarily assigned a value of 100.

Table I

| Antioxidant | Relative viscosity after— | | | | | | | | |
|---|---|---|---|---|---|---|---|---|---|
| | 0 hrs. | 24 hrs. | 48 hrs. | 72 hrs. | 96 hrs. | 120 hrs. | 240 hrs. | 404 hrs. | 600 hrs. |
| None | 100 | 100 | 100 | 100 | 100 | 100 | 100 | 100 | 100 |
| Thiobis (4,6-di-isopropyl phenol) | 80 | 500 | 1,270 | | coag. | | | | |
| Thiobis (4,6-di-tertiary butyl phenol) | 79 | | | | 51 | | | visc. | coag. |
| Thiobis (4,6-di-tertiary amyl phenol) | 72 | | | 65 | | 78 | 81 | 86 | 134 |
| Thiobis (4,6-di-secondary amyl phenol) | 67 | | | 55 | | 69 | 73 | 77 | 106 |
| Thiobis (4,6-di-tertiary octyl phenol) | 79 | | | | coag. | | | | |

The protection of the rubber afforded by having the new antioxidants incorporated in the latex may be demonstrated by measuring the physical properties after artificially aging as compared to those of the untreated compound. For this purpose 20 parts of titanium dioxide was added to the base composition such as described above. This was done in order to make films opaque enough for light reflectance readings after exposure to ultra violet light. The compounds were as follows:

| Stock | A | B | C |
|---|---|---|---|
| | Parts by Weight—Dry Basis | | |
| Rubber as 60% latex | 100 | 100 | 100 |
| Zinc oxide | 1 | 1 | 1 |
| Sulfur | 1.5 | 1.5 | 1.5 |
| Zinc diethyl dithiocarbamate | 0.5 | 0.5 | 0.5 |
| Titanium dioxide | 20 | 20 | 20 |
| Thiobis (4,6-di-tertiary amyl phenol) | | 1 | |
| Thiobis (4,6-di-secondary amyl phenol) | | | 1 |

Films were cast on glass from the latex compounds so prepared and were stripped after about 12 hours and dried at room temperature in circulating air. After about 18 hours drying the films changed from opaque to translucent indicating dryness and were then cured by heating for 60 minutes at 100° C. in circulating air. Before testing, the dry films whether cured or uncured, were conditioned by holding at constant temperature in a desiccator over sulfuric acid for at least 24 hours. The tensile properties were then measured in the usual manner.

Aging tests were carried out by heating samples of the compounds 9 hours in a bomb at 121° C. under 80 pounds air pressure per square inch.

Table II

| Stock | Cure Time in Mins. | Modulus of Elasticity in lbs./in.² at 500% Elongation | Tensile at Break in lbs./in.² | Ult. Elong., percent |
|---|---|---|---|---|
| A | 0 unaged | 480 | 2,830 | 845 |
| B | do | 485 | 2,330 | 835 |
| C | do | 466 | 3,070 | 863 |
| A | 0 aged | 185 | 300 | 630 |
| B | do | 390 | 875 | 685 |
| C | do | 430 | 970 | 680 |
| A | 60 unaged | 876 | 3,780 | 860 |
| B | do | 850 | 3,955 | 765 |
| C | do | 1,016 | 4,310 | 783 |
| A | 60 aged | 310 | 530 | 625 |
| B | do | 463 | 1,096 | 686 |
| C | do | 465 | 1,330 | 720 |

It will be noted that the antioxidants have no adverse effect on the cure and are efficient antioxidants.

In addition, samples of the cured stocks were exposed to the rays of an S–1 sunlamp. After ten days exposure there was no noticeable difference between the color of exposed stocks A and C. Stock B was only slightly darker. In order to obtain a more precise measure of the color variation, the light reflected from the surface of the stocks was measured by means of a photovolt reflectance meter calibrated against reflectance of standard MgO as 100%. The values are reported as percent of reflectance and are a measure of the whiteness or in other words absence of discoloration of the stocks, higher values meaning a whiter stock.

Table III

| Stock | Percent Light Reflectance After 10 days' Exposure To Ultra Violet Light |
|---|---|
| A | 59 |
| B | 54 |
| C | 58 |

Similar tests were carried out in latex sponge stocks comprising—

| | Parts by weight |
|---|---|
| Rubber as 60% latex | 100.0 |
| Zinc diethyl dithiocarbamate | 1.0 |
| Piperidine cyclopentamethylene dithiocarbamate | 0.25 |
| Sulfur | 3.0 |
| KOH | 0.25 |
| Zinc oxide | 6.0 |
| Antioxidant | 1.0 |

These ingredients except the zinc oxide and antioxidant were compounded in known manner and 300 gram portions of the stock frothed using 10 grams of 10% ammonium oleate as a dispersing aid. By means of a high speed mixer they were frothed to six times their original volume and the speed of the whip reduced to permit the froth to smooth out before adding the antioxidant. After 5 minutes of mixing, the antioxidant and zinc oxide were introduced and permitted to mix for 3 minutes. 10 grams of 20% sodium silicofluoride was then added and the spongy mass removed to the curing molds and the sponge cured by heating for 60 minutes in water at 100° C. Samples of the cured product were exposed to ultra violet light employing a General Electric S–1 lamp as the light source and the percent light reflectance determined as described above.

Table IV

| Antioxidant | Percent Light Reflectance after Exposure to S-1 lamp (days) | | | | |
|---|---|---|---|---|---|
| | 0 | 1 | 2 | 3 | 4 |
| None | 76 | 76 | 73 | 62 | 62 |
| Thiobis (4,6-di-tertiary amyl phenol) | 76 | 71 | 69 | 64 | 54 |
| Thiobis (4,6-di-secondary amyl phenol) | 75 | 75 | 72 | 68 | 66 |

Similar desirable properties are exhibited in synthetic rubber compositions, as for example GR–S latex type III.

In general amounts within the range of 0.5% to 3.0% based on the total elastomer solids are preferred. While 1.0% is the amount usually employed even better protection may be achieved by increasing the concentration to 2.0%. The effect of increasing quantities gradually diminishes. The antioxidant properties are of course similar regardless of how the antioxidants are incorporated into the rubber or elastomer. Thus the method of treating the rubber may vary. The antioxidant may be added to the rubber by milling or similar process or applied to the surface of a mass of crude or vulcanized rubber as well as added to the latex before coagulation.

This case is a division of application Serial No. 167,498, filed June 10, 1950.

What is claimed is:

The method of making liquid thiobis(4,6-di-secondary amyl phenol) which comprises condensing directly in the absence of a solvent one molecular proportion of 2,4-di-secondary amyl phenol and substantially one-half molecular proportion of sulfur dichloride.

References Cited in the file of this patent

UNITED STATES PATENTS

| | | |
|---|---|---|
| 2,139,321 | Mikeska et al. | Dec. 6, 1938 |
| 2,270,183 | Cook et al. | Jan. 13, 1942 |
| 2,425,824 | Peters et al. | Aug. 19, 1947 |
| 2,472,517 | Cantrell et al. | June 7, 1949 |